United States Patent
Le Scouarnec

(10) Patent No.: US 9,104,603 B2
(45) Date of Patent: Aug. 11, 2015

(54) METHOD OF EXACT REPAIR OF PAIRS OF FAILED STORAGE NODES IN A DISTRIBUTED DATA STORAGE SYSTEM AND CORRESPONDING DEVICE

(71) Applicant: Thomson Licensing, Issy de Moulineaux (FR)

(72) Inventor: Nicolas Le Scouarnec, Cesson-Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 196 days.

(21) Appl. No.: 13/622,199

(22) Filed: Sep. 18, 2012

(65) Prior Publication Data
US 2013/0073896 A1 Mar. 21, 2013

(30) Foreign Application Priority Data
Sep. 19, 2011 (EP) .................................. 11306180

(51) Int. Cl.
*G06F 11/00* (2006.01)
*G06F 11/10* (2006.01)

(52) U.S. Cl.
CPC .................................. *G06F 11/1092* (2013.01)

(58) Field of Classification Search
CPC ............ G06F 11/1092; G06F 11/1456; G06F 11/2056; G06F 2201/84; G06F 3/065; G06F 3/067
USPC ........... 710/104; 711/114, 162; 714/4.4, 6.22, 714/4.21
See application file for complete search history.

(56) References Cited

U.S. PATENT DOCUMENTS

| | | | |
|---|---|---|---|
| 6,173,377 B1 * | 1/2001 | Yanai et al. .................... | 711/162 |
| 6,654,862 B2 * | 11/2003 | Morris .......................... | 711/162 |
| 2003/0079156 A1 * | 4/2003 | Sicola et al. ...................... | 714/4 |
| 2003/0158869 A1 * | 8/2003 | Micka ........................... | 707/203 |
| 2003/0221074 A1 * | 11/2003 | Satoyama et al. ............ | 711/162 |
| 2004/0049572 A1 * | 3/2004 | Yamamoto et al. ........... | 709/224 |
| 2004/0107315 A1 * | 6/2004 | Watanabe et al. ............. | 711/114 |
| 2005/0066128 A1 * | 3/2005 | Yagisawa et al. ............. | 711/114 |
| 2006/0095700 A1 * | 5/2006 | Sato et al. ...................... | 711/165 |
| 2006/0101214 A1 * | 5/2006 | Mikami ......................... | 711/162 |
| 2006/0129608 A1 * | 6/2006 | Sato et al. ...................... | 707/200 |
| 2006/0136633 A1 * | 6/2006 | Harima et al. ................. | 710/104 |
| 2006/0150001 A1 * | 7/2006 | Eguchi et al. ..................... | 714/6 |
| 2007/0162717 A1 * | 7/2007 | Mikami ......................... | 711/162 |
| 2008/0178185 A1 * | 7/2008 | Okada et al. .................. | 718/103 |
| 2010/0138717 A1 | 6/2010 | Wu et al. | |

OTHER PUBLICATIONS

Yuchong Hu etal: "Cooperative recovery of distributed storage systems from multiple losses with network coding", IEEE journal on selected areas in communications IEEE USA, vol. 28, No. 2, Feb. 2010, pp. 268-276.

(Continued)

*Primary Examiner* — Bryce Bonzo
*Assistant Examiner* — Jeison C Arcos
(74) *Attorney, Agent, or Firm* — Myers Wolin LLC

(57) ABSTRACT

The invention proposes a method and corresponding device for exact repair of pairs of failed storage nodes interconnected in a distributed data storage system, which method and device are particularly efficient with respect to reliability while keeping the use of resources of the distributed storage network low.

16 Claims, 11 Drawing Sheets

(56) References Cited

OTHER PUBLICATIONS

Rashmi K V etal: "Optimal exact_regenerating codes for distributed storage at the MSR and MBR points via a product_matrix construction", IEEE Transactions on information theory IEEE USA, vol. 57, No. 8 Aug. 2011, pp. 5227-5239.
Shum K W etal: "Exact minimum-repair-bandwidth cooperative regenerating codes for distributed storage systems",Proceedings of the 2011 IEEE international symposium on information theory—ISIT IEEE Piscataway, NJ, USA, Aug. 2011, pp. 1442-1446.
Cadambe et al., "Asymptotic interference alignment for exact repair in distributed storage systems", 2010 44th asilomar conference on signals, systems and computers, Nov. 7, 2010, Pacific Grove, CA, USA, pp. 1617-1621.
Dimakis et al., "A survey on network codes for distributed storage", Computing Research Repository, vol. 4, Apr. 26, 2010, pp. 1-13.
Rashmi et al., "Enabling node repair in any erasure code for distributed storage", 2011 IEEE International Symposium on Information Theory Proceedings, St. Petersburg, Russia, Jul. 31, 2011, pp. 1235-1239.
Rashmi et al., "Interference alignment as a tool in network coding as applied to distributed storage", 2010 National Conference on Communications, IEEE, Piscataway, NJ, USA, Jan. 29, 2010, pp. 1-5.
Shum et al., "Cooperative regenerating codes for distributed storage systems", 2011 IEEE International Conference on Computing Proceedings, Kyoto Japan, Jun. 5, 2011, pp. 1-5.
Suh et al., "On the existence of optimal extract repair MDS codes for distributes storage", UCB/EECS 2010, Apr. 28, 2010, pp. 1-20.
Tamo et al., "MDS array codes with optimal rebuilding", 2011 IEEE International Symposium on Information Theory Proceedings, St. Petersburg, Russia, Jul. 31, 2011, pp. 1240-1244.
Wu et al., "Reducing repair traffic for erasure coding based storage via interference alignment", 2009 ISIT, Seoul Korea, Jun. 28, 2009, pp. 2276-2280.
Cadambe et al., "Distributed data storage with minimum storage regenerating codes—Exact and functional repair are asymptotically equally efficient", Computing Research Repository, vol. 4, Apr. 26, 2010, pp. 1-11.
Cadambe et al., "Minimum Repair Bandwidth for Exact Regeneration", Proceedings of IEEE Wireless network coding workshop (WINC), Jun. 2010, pp. 1-6.
Cadambe et al., "Optimal repair of MDS codes in distributed storage via subspace interference alignment", Computing Research Repository, vol. 5, Jun. 7, 2011, pp. 1-21.
Cadambe et al., "Permutation code optimal exact repair of a single failed node in MDS code based distributed storage system", IEEE international symposium on information theory proceedings (ISIT), St. Petersburg, Russia, Jul. 31, 2011, pp. 1225-1229.
Dimakis et al., "A survey on network codes for distributed storage" IEEE Proceedings, vol. 99, Mar. 2011, pp. 476-489.
Dimakis et al., "Network coding for distributed storage systems", IEEE transactions on information theory, vol. 56, No. 9, Sep. 2010, pp. 4539-4551.
Dimakis et al., "Network coding for distributed storage systems", IEEE 2007 INFOCOM, May 6, 2007, Anchorage Alaska, USA, pp. 2000-2008.
El Rouayheb et al., "Fractional repetition codes for repair in distributed storage systems", 48th Annual Allerton Conference on control, computing, and communication, Sep. 29, 2010, Univ. Ill., Illinois USA, pp. 1510-1517.
Kermarrec et al., "Repairing multiple failures with coordinated and adaptive regenerating codes", INRIA Research Report, No. 7375,10 Sep. 2010, pp. 1-19.
Kermarrec et al., "Repairing multiple failures with coordinated and adaptive regenerating codes", IEEE Network Coding, Jul. 2011, pp. 1-6.
Papailiopoulos et al., "Repair optimal erasure codes through hadamard designs", 49th Annual Allerton Conference on control, computing, and communication, Sep. 28, 2011, Univ. Ill., Illinois USA, pp. 1382-1389.
Rashmi et al., "Explicit construction of optimal exact regenerating codes for distributed storage", 47th Annual Allerton Conference on control, computing, and communication, Sep. 30, 2009, Univ. Ill., Illinois USA, pp. 1243-1249.
Shah et al., "Interference alignment in regenerating codes for distributed storage necessity and code constructions", IEEE Trans. on Information Theory, Sep. 13, 2010, pp. 1-38.
Suh et al., "Exact repair MDS code construction using interference alignment", IEEE Transactions on Information Theory, vol. 57, No. 3, Mar. 2011, pp. 1425-1442.
Le Scouarnec, "Exact scalar minimum storage coordinated regenerating codes", Presentation at IEEE ISIT, Boston, Mass. USA, Jul. 1, 2012, pp. 1-24.
Cadambe et al., "Permutation code optimal exact repair of a single failed node in MDS code based distributed.storage system", IEEE international symposium on information theory proceedings (ISIT), St. Petersburg, Russia, Jul.31, 2011, pp. 1225-1229.
Kermarrec et al., "Repairing multiple failures with coordinated and adaptive regenerating codes", INRIA Research Report, No. 7375, Sep. 10, 2010, pp. 1-19.
Suh et al., "Exact repair MDS code construction using interference alignment", IEEE Transactions on Information Theory, vol. 57, No. 3, March 2011, pp. 1425-1442.
Wang E At., "MFR: Multi-Loss Flexible Recovery in Distributed Storage Systems" 2010 IEEE International Conference on Communications, Cape Town, South Africa, May 23, 2010, pp. 1-5.
Wu, Y., "A Construction of Systematic MDS Codes With Minimum Repair Bandwidth", IEEE Transactions on Information Theory, vol. 57, No. 6, Jun. 2011, pp. 3738-3741.

* cited by examiner

METHOD OF EXACT REPAIR OF PAIRS OF FAILED STORAGE NODES IN A DISTRIBUTED DATA STORAGE SYSTEM AND CORRESPONDING DEVICE

This application claims the benefit, under 35 U.S.C. §119 of EP Patent Application 11306180.8, filed 19 Sep. 2011.

1. FIELD OF INVENTION

The present invention relates to the field of distributed data storage. In particular, the present invention relates to a method and device for repairing data to a distributed data storage system, which method and device are particularly efficient with respect to reliability while keeping the use of resources of the distributed storage network low.

2. TECHNICAL BACKGROUND

The quantity of digital information that is stored by digital storage systems, be it data, photos or videos, is ever increasing. Today, a multitude of digital devices are interconnected via networks such as the Internet, and distributed systems for data storage, such as P2P (Peer-to-Peer) networks and cloud data storage services, have become an interesting alternative to centralized data storage. Even common user devices, such as home PC's or home access gateways can be used as storage devices in a distributed data storage system. However, one of the most important problems that arise when using a distributed data storage system is its reliability. In a distributed data storage system where storage devices are interconnected via an unreliable network such as the Internet, connections to data storage devices can be temporarily or permanently lost, for many different reasons, such as device disconnection due to a voluntary powering off or involuntary power surge, entry into standby mode due to prolonged inactivity, connection failure, access right denial, or even physical failure. Solutions must therefore be found for large-scale deployment of fast and reliable distributed storage systems. According to prior art, the data to store are protected by devices and methods adding redundant data. According to prior art, this redundant data are either created by mere data replication, through storage of simple data copies, or, for increased storage quantity efficiency, in the form of storing the original data in a form that adds redundancy, for example through application of Reed-Solomon (RS) codes or other types of erasure correcting codes. For protecting the distributed data storage against irremediable data loss it is then essential that the quantity of redundant data that exists in a distributed data storage system remains at all times sufficient to cope with an expected loss rate. As failures occur, some redundancy disappears. In particular, if a certain quantity of redundant data is lost, it is regenerated in due time to ensure this redundancy sufficiency, in a self-healing manner. In a first phase the self-healing mechanism monitors the distributed data storage system to detect device failures. In a second phase the system triggers regeneration of lost redundancy data on a set of spare devices. The lost redundancy is regenerated from the remaining redundancy. However, when redundant data is based on erasure correcting codes, regeneration of the redundant data is known as inducing a high repair cost, i.e. resulting in a large communication overhead. It requires downloading and decoding (application of a set of computational operations) of a whole item of information, such as a file, in order to regenerate the lost redundancy. This high repair cost can however be reduced significantly when redundant data is based on so-called regenerating codes, issued from network information theory; regenerating codes allow regeneration of lost redundancy without decoding.

Lower bounds (tradeoffs between storage and repair cost) on repair costs have been established both for the single failure case and for the multiple failures case. The two extreme points of the tradeoff are Minimum Bandwidth (MBR/MBCR), which minimizes repair cost first, and Minimum Storage (MSR/MSCR), which minimize storage first. Codes matching these theoretical tradeoffs can be built using non-deterministic schemes such as random linear network codes.

However, non-deterministic schemes for regenerating codes have the following drawbacks: they (i) require homomorphic hash function to provide basic security (integrity checking), (ii) cannot be turned into systematic codes, i.e. offering access to data without decoding (i.e. without additional computational operations), and (iii) provide only probabilistic guarantees. Deterministic schemes are interesting if they offer both systematic form (i.e., the data can be accessed without decoding) and exact repair (during a repair, the block regenerated is equal to the lost block, and not only equivalent). Exact repair is a more constraining problem than non-deterministic repair which means that the existence of non-deterministic schemes does not imply the existence of schemes with exact repair.

For the single failure case, code constructions with exact repair have been given for both the MSR point and the MBR point. However, the existence of codes supporting the exact repair of multiple failures, referred to hereinafter as exact coordinated/adaptive regenerating codes, is still an open question. Prior art concerns the case of single failures and a restricted case of multiple failure repairs, where the data is split into several independent codes and each code is repaired independently, using a classical repair method for erasure correcting codes. This case is known as d=k, d being the number of nodes contacted during repair and k being the number of nodes contacted when decoding. The latter method does not reduce the cost in terms of number of bits transferred over the network for the repair operation when compared to classical erasure correcting codes.

Document "Exact minimum repair bandwidth cooperative regenerating codes for distributed storage systems", Proceedings of the 2011 IEEE international symposium on information theory, is limited to the above discussed case d=k because the method described in this document is not powerfull enough to allow d>k. Having d>k allows to obtain a reduction of repair cost in terms of amount of data to be transmitted in the network between nodes; more nodes are contacted, but for finally lesser data exchanged. This relation is not linear, i.e. the more nodes are contacted, the lesser total data is exchanged. Because of this limitation to the case d=k, the method described in the document cannot take full advantage of regenerating codes and the repair costs remain equivalent that observed for systems using erasure correcting codes such as RS (Reed-Solomon). The method described in the document does not use network coding, i.e. generation of new data blocks from encoded data without a decoding/encoding step.

Thus, prior art solutions for regeneration of redundant data in distributed storage systems that are based on exact regenerating codes can still be optimized with regard to the exact repair of multiple failures. This is interesting for application in distributed data storage systems that require a high level of data storage reliability while keeping the repair cost as low as possible.

3. SUMMARY OF THE INVENTION

In order to propose an optimized solution to the problem of how to repair multiple failures in a distributed storage system using exact regenerating codes, the invention proposes a method and device for adding lost redundant data in a distributed data storage system through coordinated regeneration of codes different than the previously discussed regenerating codes, because of the exact repair of lost data.

The mentioned optimization procured by the method of the invention when compared to prior art methods is related to reduction of storage and network repair cost when compared to RS codes. Storage cost is expressed in data size. Network repair cost is expressed in amount of data transmitted over the network interconnecting the distributed storage devices.

When the method of the invention is compared to functional regenerating codes, i.e. non-deterministic regenerating codes, the method of the invention is optimized with regard to offering increased security that lost data is repairable, the method of the invention being a method of exact repair, and reduced computational cost, the repair needing less computational resources.

These advantages and other advantages not mentioned here, that make the device and method of the invention advantageously well suited for exact repair of pairs of failures in a distributed storage system, will become clear through the detailed description of the invention that follows.

In order to optimize the impact on network resources needed to regenerate lost data, the invention proposes a method of exact repair of pairs of failed storage nodes interconnected in a distributed storage system, comprising:
  a step of identification where data lost by a failure of a pair of failed storage nodes is identified as a first lost block and a second lost block, the first lost block comprising first lost sub-blocks and the second lost block comprising second lost sub-blocks and a first new storage node and a second new storage node is chosen to replace the pair of failed storage nodes, and a first set and a second set of at least three non failed storage nodes are determined for participating in the exact repair;
  a first preparation step where a first linear operation is applied to each of the storage nodes in the first set over all sub-blocks stored by it, resulting in a first result sub-block that aligns interfering information about the second lost block, and a second linear operation is applied to each of the storage nodes in the second set over all sub-blocks stored by it, resulting in a second result sub-block that aligns interfering information about the first lost block;
  a first transfer step where all first result sub-blocks are transferred to the first new storage node, and all second result sub-blocks are transferred to the second new storage node;
  a second preparation step where the first linear operation is applied to the first new storage node over all sub-blocks received by it, resulting in a third result sub-block that aligns interfering information about the first lost block, and the second linear operation is applied to the second new storage node over all sub-blocks received by it, resulting in a fourth result sub-block that aligns interfering information about the second lost block;
  a second transfer step where the third result sub-block is transferred to the second new storage node, and the fourth result sub-block is transferred to the first new storage node;
  a recovery step, where the first lost sub-blocks are calculated from all sub-blocks received by the first new storage node, and the second lost sub-blocks are calculated from all sub-blocks received by the second new storage node.

According to a variant embodiment of the invention, the first and the second set of non-failed storage nodes are determined such that the first and the second set of non-failed storage nodes comprises the same storage nodes.

According to a variant embodiment of the invention, the first and the second set of non-failed storage nodes are determined such that the first and the second set of non-failed nodes comprise at least one distinct storage node.

According to a variant embodiment of the invention, the first and the second set of non-failed storage nodes are determined such that the first and the second set of non-failed nodes comprise totally distinct storage nodes.

According to a variant embodiment of the invention, the storage nodes are implemented by distinct storage devices.

According to a variant embodiment of the invention, at least some of the storage nodes are implemented by a same storage device.

The invention also concerns a device for exact repair of pairs of failed storage devices interconnected in a distributed storage system, the device comprising:
  means for identification of data lost by a failure of a pair of failed storage devices, where lost data is identified as a first lost block and a second lost block, the first lost block comprising first lost sub-blocks and the second lost block comprising second lost sub-blocks and a first new storage device and a second new storage device is chosen to replace the pair of failed storage devices, and a first set and a second set of at least three non failed storage devices are determined for participating in the exact repair;
  means for application of a first preparation step where a first linear operation is applied to each of the storage devices in the first set over all sub-blocks stored by it, resulting in a first result sub-block that aligns interfering information about the second lost block, and a second linear operation is applied to each of the storage devices in the second set over all sub-blocks stored by it, resulting in a second result sub-block that aligns interfering information about the first lost block;
  means for transmission of all first result sub-blocks to the first new storage device, and for transmission of all second result sub-blocks to the second new storage device;
  means for executing a second preparation step where the first linear operation is applied to the first new storage device over all sub-blocks received by it, resulting in a third result sub-block that aligns interfering information about the first lost block, and the second linear operation is applied to the second new storage device over all sub-blocks received by it, resulting in a fourth result sub-block that aligns interfering information about the second lost block;
  means for transmission the third result sub-block to the second new storage device, and for transmission of the fourth result sub-block to the first new storage device;
  means for recovery of the first lost sub-blocks through calculation from all sub-blocks received by the first new storage device, and of the second lost sub-blocks through calculation from all sub-blocks received by the second new storage device.

4. LIST OF FIGURES

More advantages of the invention will appear through the description of particular, non-restricting embodiments of the invention. The embodiments will be described with reference to the following figures:

FIG. 1 shows a typical prior-art use of erasure correcting codes to provide error resilience in distributed storage systems.

FIG. 2 further illustrates the background of the invention.

FIGS. 3*a-c* illustrate the method of the invention of an exact repair of two failed storage nodes.

FIGS. 4*a-c* illustrate a different way of determining which storage nodes are comprised in the first and the second set of non-failed storage nodes.

5. DETAILED DESCRIPTION OF THE INVENTION

Figure 1:
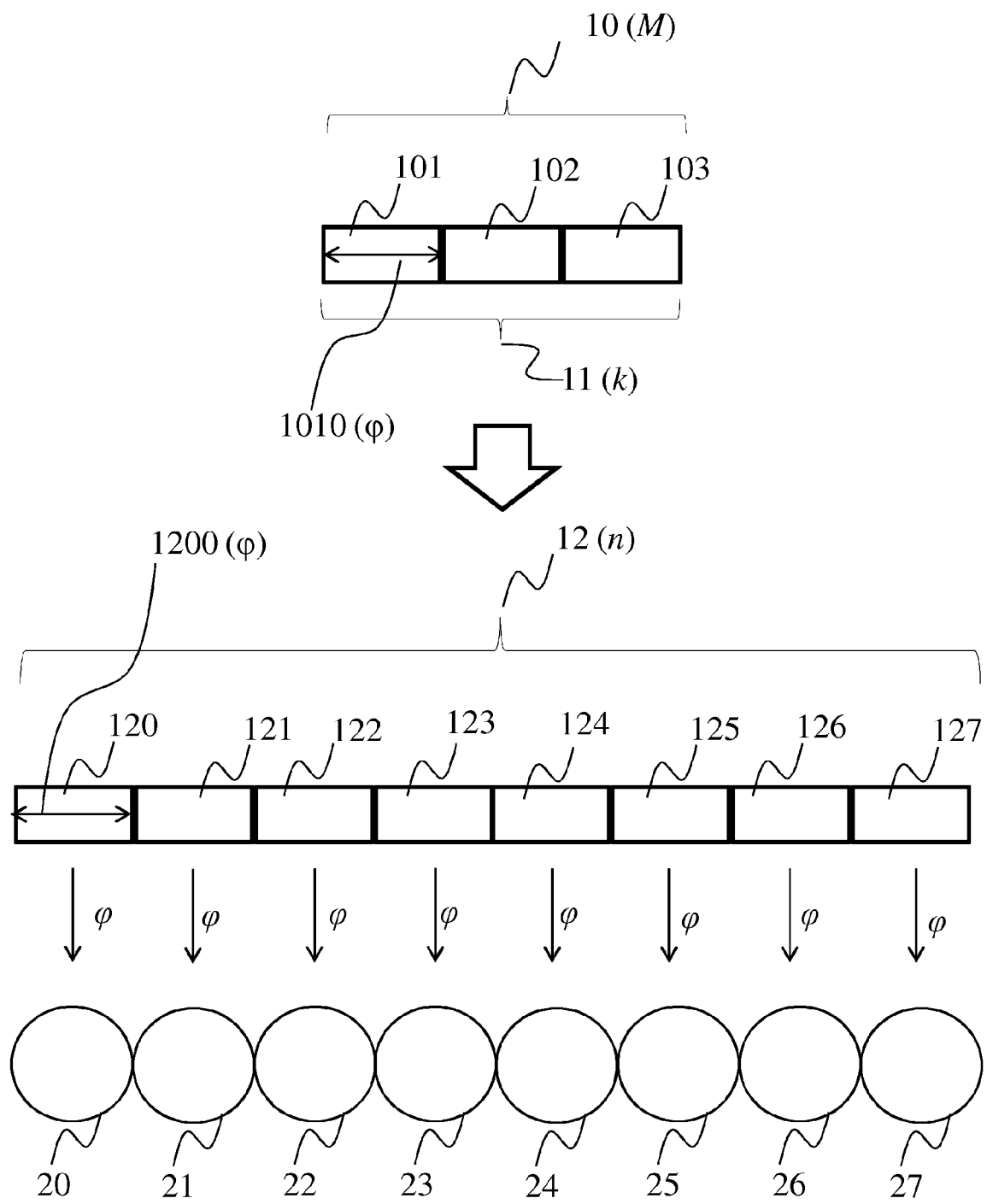

FIG. 1 shows a typical prior-art use of erasure correcting codes to provide error resilience in distributed storage systems. These erasure correcting codes are for example implemented using well-known Reed-Solomon coding (RS), often referred to as RS(n,k), where n is the number of encoded data blocks, and k is the number of blocks of the original file. An example RS(8,3) data encoding is illustrated for a file 10 of quantity M bits. First, the file is divided into k=3 blocks of quantity $\phi$=M/k, the quantity being illustrated by arrow 1010. After application of an RS(8,3) encoding algorithm 11, the original data is transformed in n=8 different encoded data blocks of the same quantity of each of the original k data blocks, i.e. of quantity $\phi$, the quantity being illustrated by arrow 1200. It is this RS(8,3) encoded data that is stored in the distributed data storage system, represented in the figure by circles 20 to 27 which represent storage nodes or devices of a distributed data system. Each of the different encoded blocks of quantity $\alpha$ is being stored on a different storage device. There is no need to store the original data 101-103, knowing that the original data file can be recreated from any k out of n different encoded blocks. The number n=8 of different encoded data blocks is for example chosen as a function of the maximum number of simultaneous device failures that can be expected in the distributed data storage system, in our example n−k=5.

Figure 2:
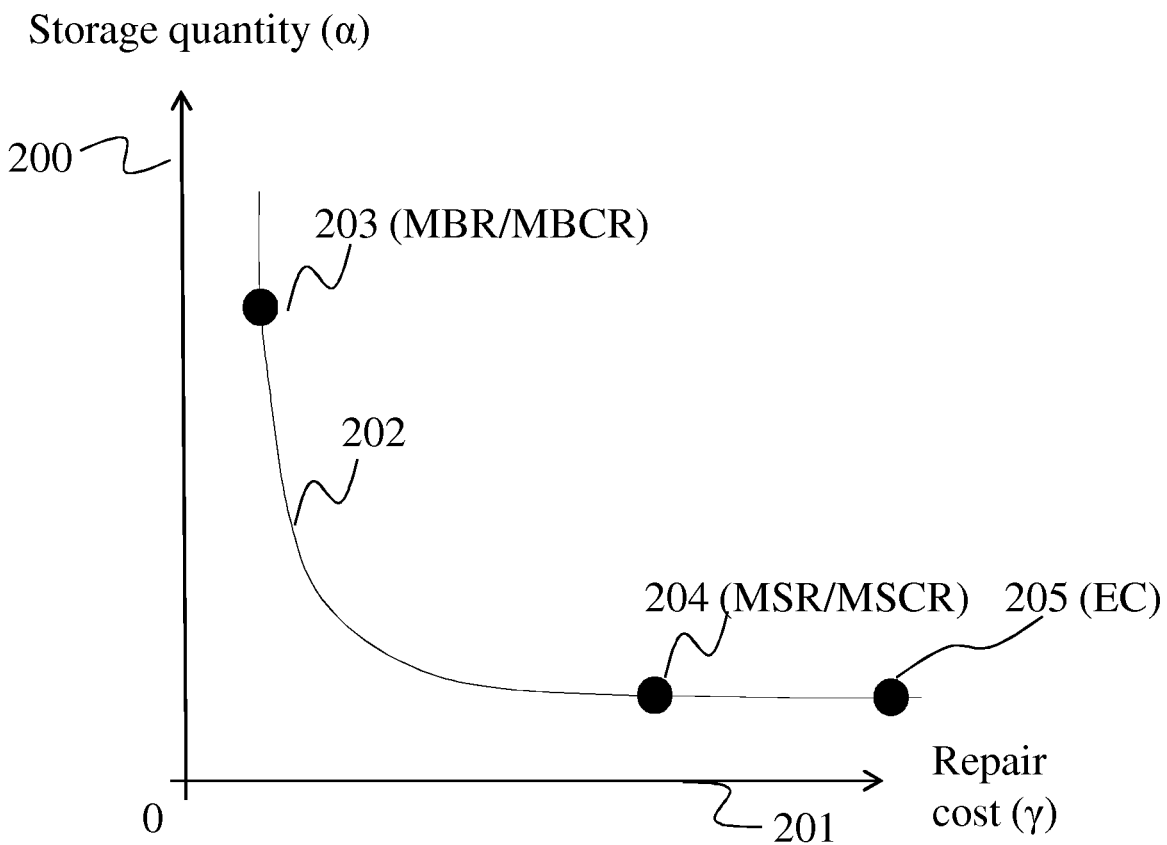

FIG. 2 further illustrates the background of the invention. Known regenerating codes MBR (Minimum Bandwidth Regenerating) 203 and MSR (Minimum Storage Regenerating) 204 offer improved performances in terms of network bandwidth used for repair when compared to classical erasure correcting codes 205.

We consider an n devices system storing a file i of M bits. The file is encoded and distributed over all n devices, each of these storing $\alpha$ bits, in such a manner that any of k devices allow recovering the file i. Whenever the devices fail, they must be repaired to avoid that the level of redundancy drops below a critical level where a complete repair is no longer possible. Repairing with classical erasure correcting codes implies downloading and decoding the whole file before encoding again. As can be seen at point 205 in FIG. 2, this implies huge repair costs in terms of network communications. These costs can significantly be reduced when using regenerating codes, of which the points MBR 203 and MSR 204 are shown. MBR 203 represents optimal performance in terms of minimal quantities of data exchanged between storage nodes for the repair, and MSR 204 representing optimal performance in terms of storage needed by the storage nodes to ensure a possible repair. Repair cost in terms of data exchanged over the network y is depicted on the x-axis, whereas storage quantity a is represented on the y-axis. With regenerating codes, in order to repair, the failed device contacts d >k non-failed devices and gets a quantity $\beta$ data from each, $\beta<\alpha$. Regenerating codes have been extended to the handling of cases allowing to repair simultaneously t failed storage nodes. In this case the devices that replace the t failed devices coordinate and exchange $\beta'$ bits. The data is then processed and a quantity $\alpha$ is stored. The two extreme points MSR, named MSCR when multiple repairs are considered, and MBR, named MBCR when multiples repairs are considered, are the most interesting optimal tradeoff points. Non-deterministic coding schemes matching these tradeoffs can be built using random linear network codes. The corresponding non-deterministic repairs are termed as functional repairs. However, by replacing Reed-Solomon codes with non-deterministic regenerating codes, the exact repair property is lost. The invention proposes the use of deterministic regenerating codes that do not loose the exact property that was available with Reed-Solomon codes, while style allowing to significantly optimize the use of resources in the distributed storage system as with non-deterministic regenerating codes. This is important because non-determinstic codes, which do not support exact repair, have several disadvantages. They have high decoding costs. They make the implementation of integrity checking complex by requiring the use of homomorphic hashes, which are specific hashes such that the hash of a linear combination of blocks can be computed from the hashes of these individual blocks. They cannot be turned into systematic codes, which provide access to data without decoding. Finally, they can only provide probabilistic guarantees for repair.

The current invention therefore concerns deterministic schemes where a lost data block is regenerated as an exact copy instead of being only functionally equivalent. The current invention concerns a code construction for scalar MSCR codes (a code is scalar when blocks are sub-divided into exactly d−k+t indivisible sub-blocks, contrary to vector codes, when blocks are subdivided into (d+k−t)C sub-blocks with C being an integer constant greater than 1) supporting exact repair for d>k, k=2 and t=2 (d=the number of contacted non-failed storage nodes for the repair; k=number of blocks in which the data item i is split; t=number of failed devices). The method allows repairing exactly two systematic storage nodes, two redundancy storage nodes, or a mix of one systematic storage node and a redundancy storage node. A systematic code is a code where the k first encoded symbols are equal to the k original symbols. These k first encoded symbols are the systematic symbols, we name the corresponding storage nodes "systematic" storage nodes. The other nodes are "redundancy" storage nodes.

Figure 3A:
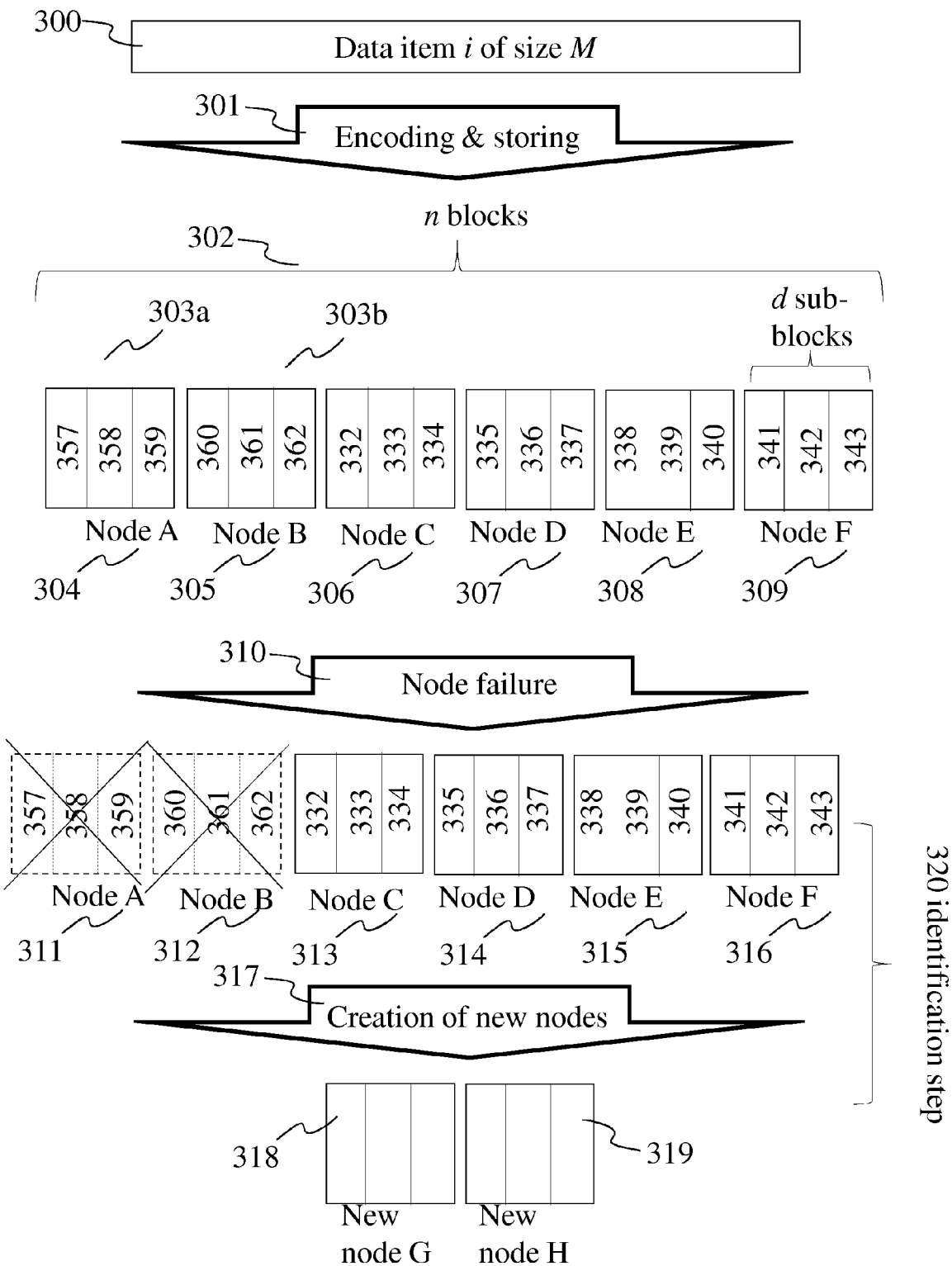
Figure 3B:
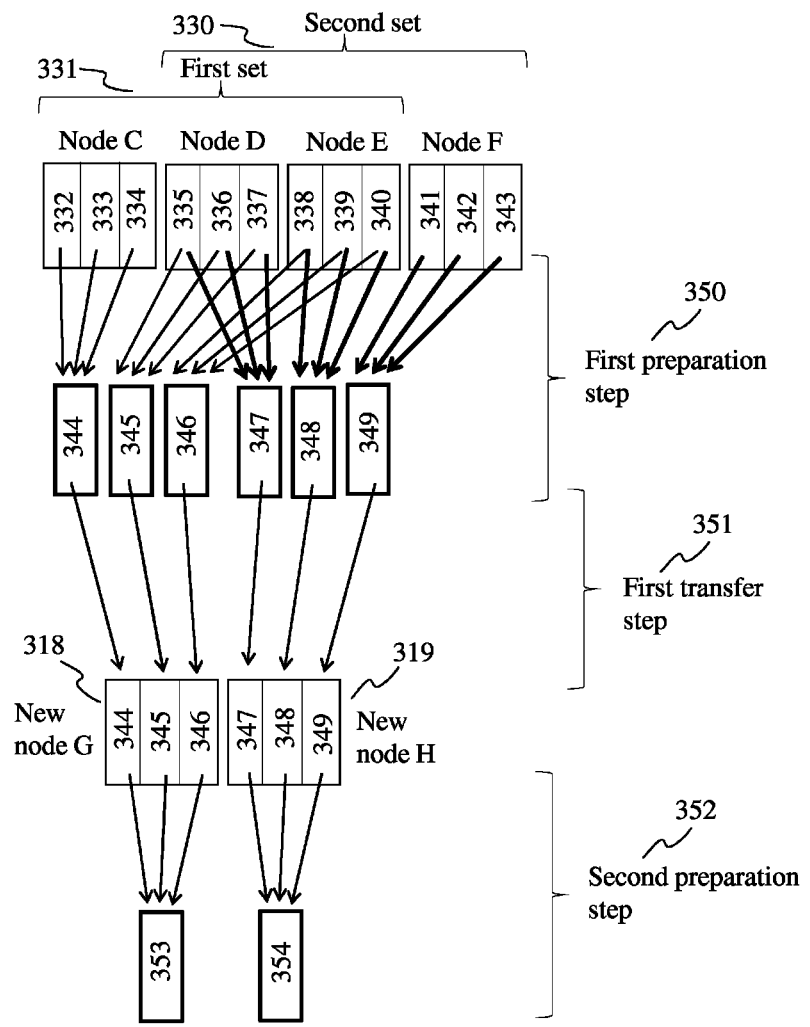
Figure 3C:
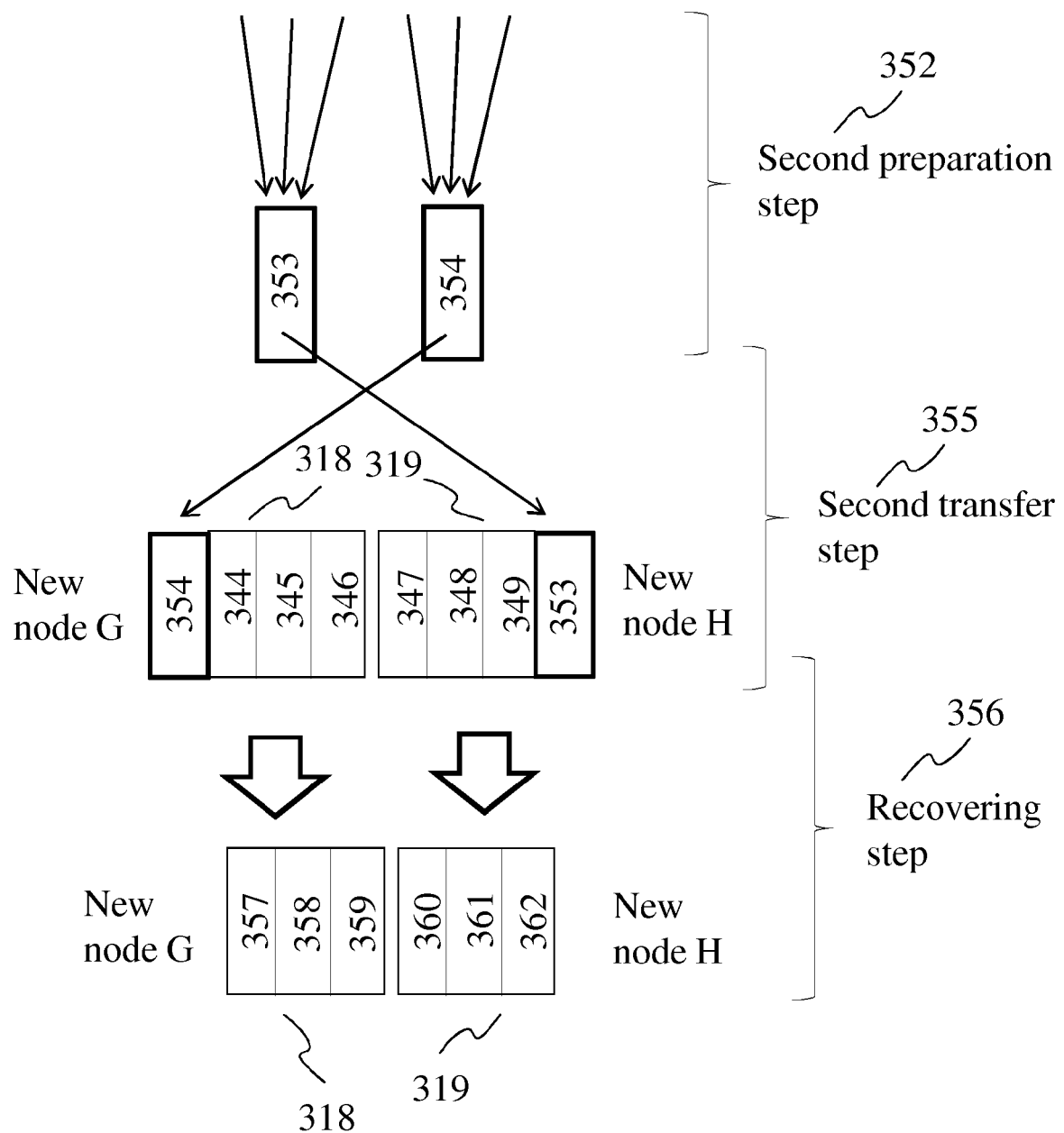

FIGS. 3*a-c* illustrate the method of the invention of an exact repair of pairs of failed storage nodes by means of an example. The method can be applied to the repair of a multiple of 2 nodes, for example 2, 4, 6, 8 or 10, in such a way that each repair is done for separate sets of two failed storage nodes.

Referring to FIG. 3*a*, to store a data item i of size M 300 in the distributed data storage system according to the invention, an operation 301 is required that encodes the data item i, creates encoded redundancy in the form of n blocks of encoded data sub-divided in d sub-blocks such that any 2 out of n blocks allow to recover the whole data item i (300). This encoding method is a classical encoding method in erasure correcting codes that we will not describe here. Blocks of encoded data are stored in a distributed manner, distributed over the storage nodes of the distributed storage system. Encoding methods for encoding the data item i and creation of redundancy data have been discussed previously and are therefore not explained here further. FIGS. 3a-c illustrate an exact repair of a pair of failed storage nodes interconnected in a distributed data storage system, and a data item is encoded into n blocks (302) such that any k=2 out of the n blocks allows recovering the whole data item i (300), each of the n blocks (302) being stored on a storage node (304-309) belonging to the set of n storage nodes, each of the n blocks being composed of d>k sub-blocks (sub-blocks 357-359 for node A 304; sub-blocks 360-362 for node B 305; etc). Ensuring that any k=2 out of the n blocks allows recovering the whole data item i is done by choosing the encoding method, and notably by the choice of appropriate encoding matrices, such as the Vandermonde matrices.

Upon failure (310) of a pair of storage nodes (node A: 304, node B: 305), the data lost by the two failed nodes is identified in an identification step (320) as a first lost block (303a) and a second lost block (303b) and two new storage nodes are created (node G 318, node H 319; action 317). Referring to FIG. 3b, two sets of storage nodes, a first (331) and a second (330) are determined for participating in the exact repair of the first and the second lost blocks. This determination can be done in different ways according to different variant embodiments of the invention and will be discussed later on. Each of the sets comprises at least three non-failed storage nodes because the method applies to d>k and k=2.

Then, in a first preparation step (350), which is performed for each of the storage nodes in the first (331) and in the second set (330) of non-failed storage nodes, a first linear operation is applied to all sub-blocks of each non-failed storage node in the first set of non-failed storage nodes (plain arrows), and a second linear operation is applied to all sub-blocks of each non-failed storage node in the second set (emphasized arrows), each operation producing a result sub-block, i.e. generating respectively a set of first (344, 345, 346) and a set of second (347, 348, 349) result sub-blocks.

In mathematics, a linear operation also called linear -transformation, -map, -operator or -function, is a function between two vector spaces that preserves the operations of vector addition and scalar multiplication.

The first linear operation aligns interfering information about the second lost block contained in the produced first result sub-block, in a way that is the same for all storage nodes that are in the first set of non-failed storage nodes, whereas the second linear operation aligns interfering information about the first lost block contained in the produced second result sub-block in a way that is the same for all storage nodes that are in the second set of non-failed storage nodes. For further details with regard to the mentioned linear interference alignment operations, see FIG. 5.

Then, a first transfer step (351) is performed for each of the non-failed storage nodes participating in the repair, comprising the transfer of the produced first and second result sub-blocks (344-349) to the first and respective second of the new storage nodes.

In a second preparation step (352), the first linear operation is applied to the first new storage node over all the sub-blocks (344-346) received by it and the second linear operation is applied to the second new storage node over all the sub-blocks (347-349) received by it, which results in a third sub-block (353), respectively in a fourth sub-block (354), the first linear operation aligning interfering information about the first lost block, and the second linear operation aligning interference information about the second lost block.

Now, referring to FIG. 3c, in a second transfer step (355), the third and fourth result sub-blocks are transferred such that the second new storage node receives the third result sub-block, and the first new storage node receives the fourth result sub-block.

Finally, in a recovery step (356) the first and second new storage nodes apply linear operations to all received result sub-blocks (354, 344, 345, 346 for new node G 318, and 347, 348, 349, 353 for new node H 319) to recover exactly the first (357,358,359) and the second (360,361,362) lost blocks.

Figure 4A:
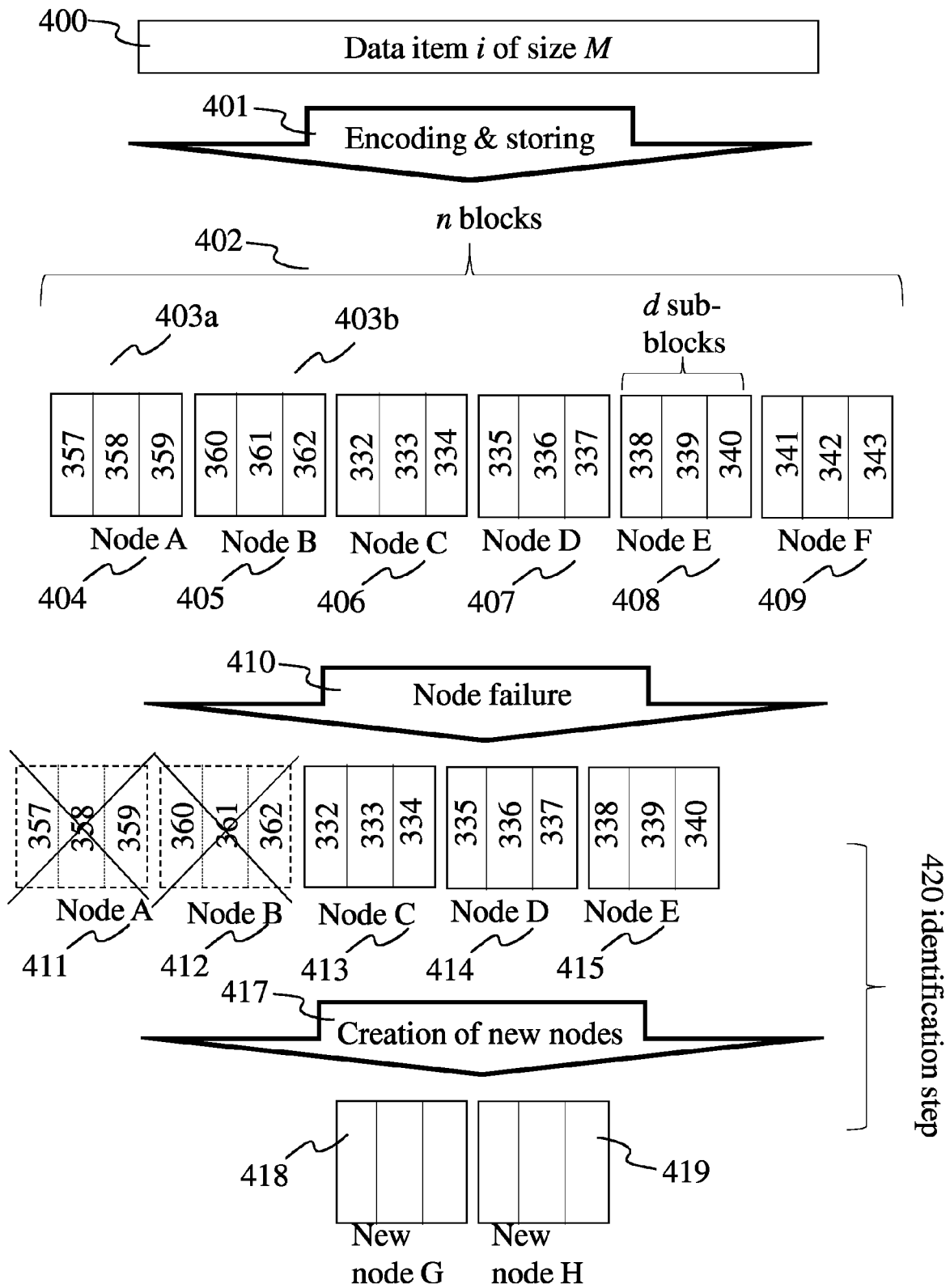
Figure 4B:
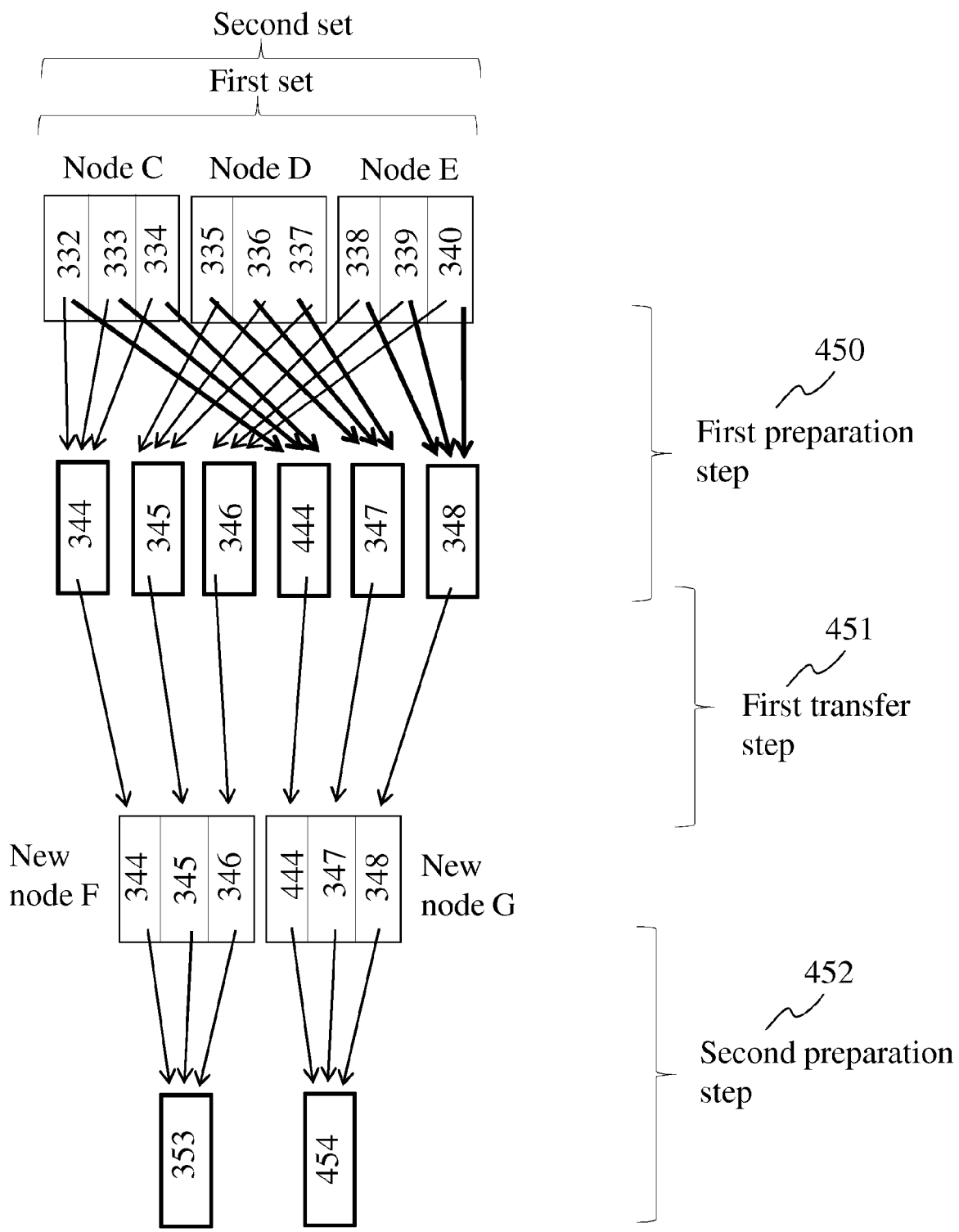
Figure 4C:
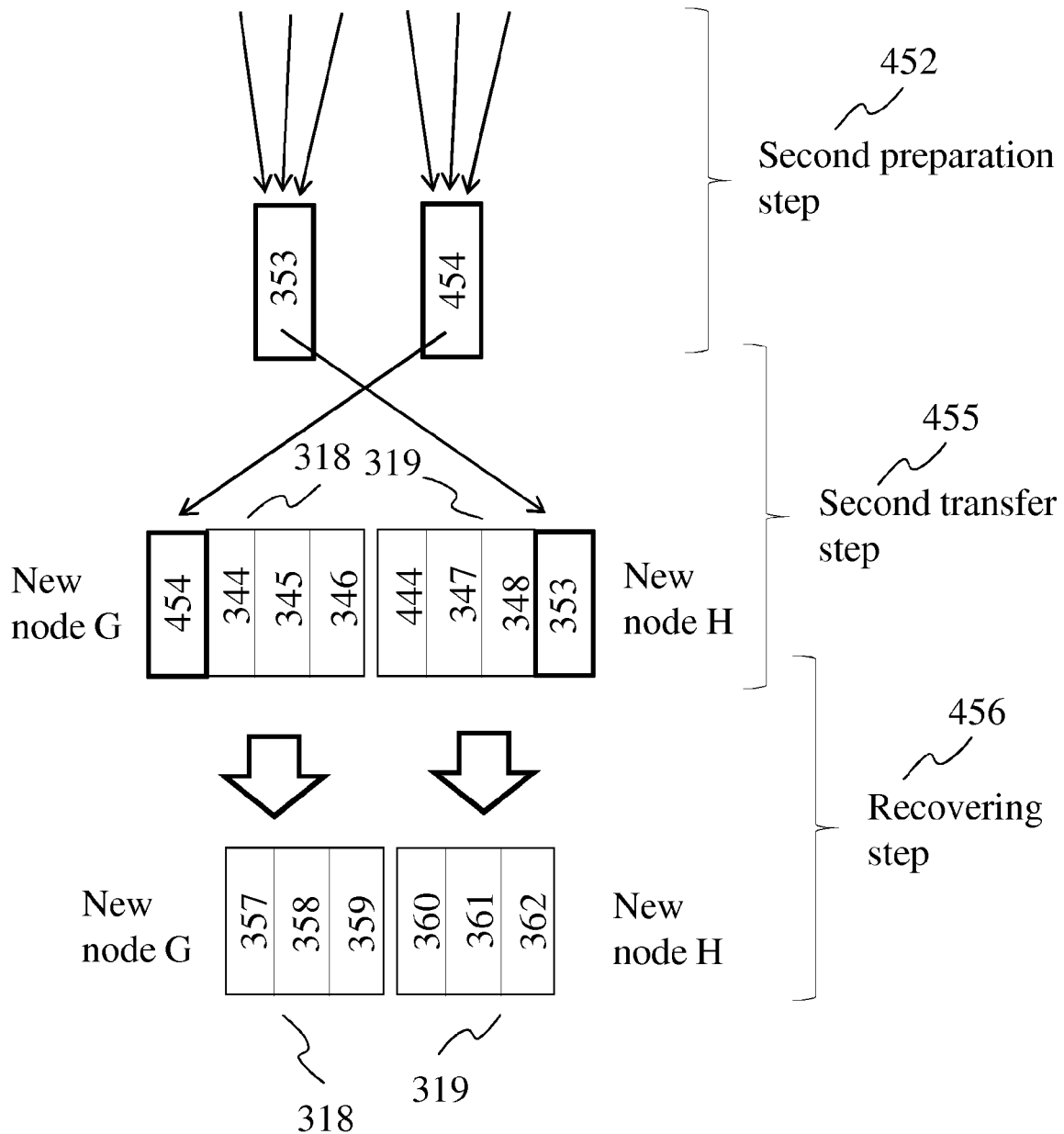

As is mentioned, the determination of which of at least three non-failed storage nodes compose the first and the second set of non-failed storage nodes can be done in different ways according to different variant embodiments of the invention. FIGS. 4a-c illustrate such a different way of determination of the nodes for the first and the second set of non-failed storage nodes. Notably, here the first and second set of non-failed storage nodes are determined such that the first and the second set of non-failed storage nodes comprise the same storage nodes. This is a case that is advantageous notably when (1) the number of storage nodes available for the repair is too limited to allow using distinct sets, or when (2) though possible, it is preferable not to use distinct sets, in order to restrict to the minimum the number of storage nodes that need to be contacted for the repair. Though the storage nodes chosen for the first and second sets of non-failed storage nodes that take part in the exact repair are different from the first and second sets illustrated in FIGS. 3a-c, the steps of the method are executed in the same manner as already described and are thus not further discussed here.

Other ways of determination of the nodes in the first and the second set are possible as has been mentioned and each has its specific advantages. For example, the sets are determined in such a way that the sets comprise at least one distinct storage node. Such a case is advantageous if one wants to spread the repair charge over different devices, to avoid putting the repair charge on the same devices. This variant can be pushed further so that the sets are determined in such a way that the sets comprise totally distinct storage nodes. For example, the first set comprises storage nodes that are geographically in time zones that are distinct enough to allow taking advantage of a lower activity of the storage nodes in a nighttime time zone.

Figure 5:
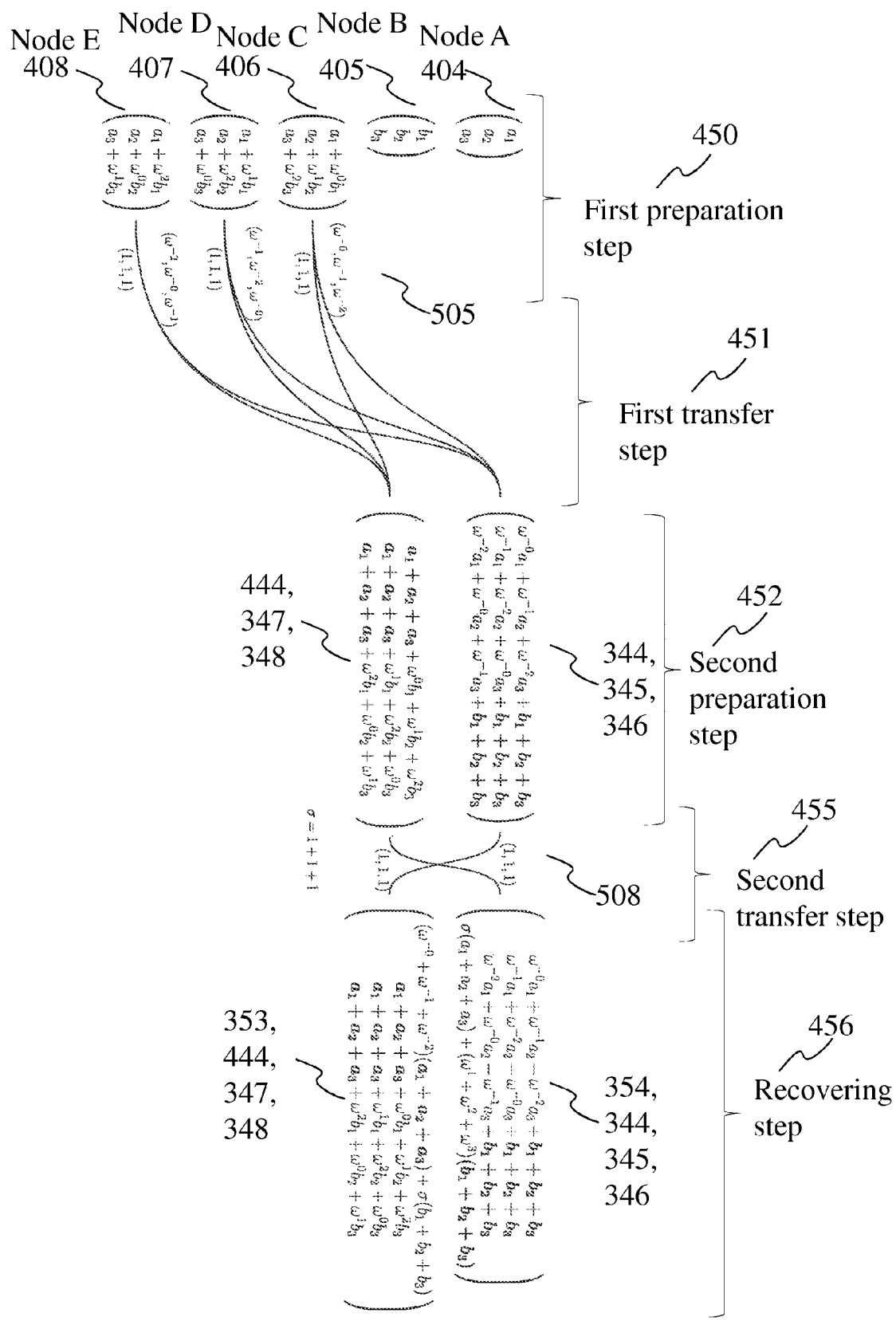
FIG. 5 illustrates the method of the invention in a more formal manner.

FIG. 5 illustrates the method of the invention in a more formal manner. The reference numbers are the same as used in FIGS. 4a-c, the example being based on same first and second sets of at least three non-failed devices participating in the exact repair of the two failed devices 404 and 405.

In this description of FIG. 5, we show which vectors are used for the repair of one particular code when the two systematic nodes have failed for the parameters n=5, k=2, d=3, t=2. The code is chosen here as an example. Using such a specific example helps to clarify how the interference alignment is performed but the method can be applied to any code n≥5, d≥3 and any pattern of failure, for example the two failed nodes comprise one redundancy node and one systematic node, or the two failed nodes comprise two systematic nodes. The code is defined over a finite field F having a generator element w.

Referring to the figure, to store a data item in the distributed data storage system according to the invention, the data is encoded into n=5 blocks composed of d=3 sub-blocks. The two first systematic nodes store $a=(a_1, a_2, a_3)$ and $b=(b_1, b_2, b_3)$. The i-th redundancy node stores $r_i=(a_i+w^{(i \bmod 3)}b_1, a_2+w^{(i+1 \bmod 3)}b_2, a_3+w^{(i+2 \bmod 3)}b_3)$.

Upon a node failure (310) of a pair of storage nodes (node A: 304, node B: 305), the data lost by the two failed nodes is identified in an identification step (320) as a first lost block (303a) a=($a_1, a_2, a_3$) and a second lost block (303b) b=($b_1, b_2, b_3$) and two new storage nodes are created (node G 318, node H 319; action 317). Referring to the figure, two identical sets of storage nodes, a first (406,407,408) and a second (406,407, 408) are determined for participating in the exact repair of the first and the second lost blocks a and b. The determination is done such as to use all available nodes.

Then, in a first preparation step (450), which is preformed for each of the storage nodes in the first and in the second set of non-failed storage nodes, a first linear operation is applied to all sub-blocks of each non-failed storage node in the first set of non-failed storage nodes, In order to produce sub-blocks for the first new node, node 406 performs a scalar product between the vector stored $r_1$ and the repair vector ($w^{-0}, w^{-1}, w^{-2}$) to produce a sub-block $w^{-0}a_1+w^{-1}a_2+w^{-2}a_3+b_1+b_2+b_3$ (344); and node 407 performs a scalar product between the vector stored $r_1$ and the repair vector ($w^{-1}, w^{-2}, w^{-0}$) to produce a sub-block $w^{-1}a_1+w^{-2}a_2+w^{-0}a_3+b_1+b_2+b_3$ (345); and node 408 performs a scalar product between the vector stored $r_1$ and the repair vector ($w^{-2}, w^{-0}, w^{-1}$) to produce a sub-block $w^{-2}a_1+w^{-0}a_2+w^{-1}a_3+b_1+b_2+b_3$ (346). These operations align the interfering information about second lost block b contained in the three result sub-blocks (344,345,346) in the same way ($b_1+b_2+b_3$). In order to produce sub-blocks for the second new node, node 406 perform a scalar product between the vector stored $r_1$ and the repair vector (1,1,1) to produce a sub-block $a_1+a_2+a_3+w^0b_1+w^1b_2+w^2b_3$ (444); and node 407 perform a scalar product between the vector stored $r_1$ and the repair vector ($w^{-1}, w^{-2}, w^{-0}$) to produce a sub-block $a_1+a_2+a_3+w^1b_1+w^2b_2+w^0b_3$ (347); and node 408 perform a scalar product between the vector stored $r_1$ and the repair vector ($w^{-2}, w^{-0}, w^{-1}$) to produce a sub-block $a_1+a_2+a_3+w^2b_1+w^0b_2+w^1b_3$ (348). These operations align the interfering information about first lost block a contained in the three result sub-blocks (444,347,348) in the same way ($a_1+a_2+a_3$)

Then, a first transfer step (351) is performed for each of the non-failed storage nodes participating in the repair, comprising the transfer of the produced first and second result sub-blocks (344,345,346,347,348,444) to the first and respective second new storage nodes.

In a second preparation step (352), the first linear operation is applied by the first new storage node over all the sub-blocks (344-346) received by it, consisting in a scalar product between stored vector and repair vector (1,1,1) and producing a third sub-block (353) which is $(1+1+1)(a_1+a_2+a_3)+(w^1+w^2+w^3)(b_1+b_2+b_3)$ and the second linear operation is applied by the second new storage node over all the sub-blocks (347-349) received by it, consisting in a scalar product between stored vector and repair vector (1,1,1) and producing a fourth sub-block (354) which is $(w^{-1}+w^{-2}+w^{-3})(a_1+a_2+a_3)+(1+1+1)(b_1+b_2+b_3)$.The first linear operation aligning interfering information about the first lost block a similarly to previous step ($a_1+a_2+a_3$), and the second linear operation aligning interference information about the second lost block b similarly to previous step ($b_1+b_2+b_3$)

In a second transfer step (355), the third (353) and fourth (354) result sub-blocks are transferred such that the second new storage node receives the third result sub-block, and the first new storage node receives the fourth result sub-block.

Finally, in a recovery step (356) a calculation is applied to all received result sub-blocks, so that the first and second new storage nodes apply linear operations to all received result sub-blocks (354, 344, 345, 346 for the first new node G (not shown in this figure, see however FIG. 3c), and 347, 348, 444, 353 for second new node H (not shown in this figure, see however FIG. 3c) to recover exactly the first a=($a_1, a_2, a_3$) (357,358,359; not shown in this figure, see however FIG. 3c) and the second b=($b_1, b_2, b_3$) (360,361,362; not shown in this figure, see however FIG. 3c) lost blocks. The received sub-blocks correspond to equations with unknown variables, and the calculation comprises solving the equations and finding the unknown variables through linear operations.

Figure 6:
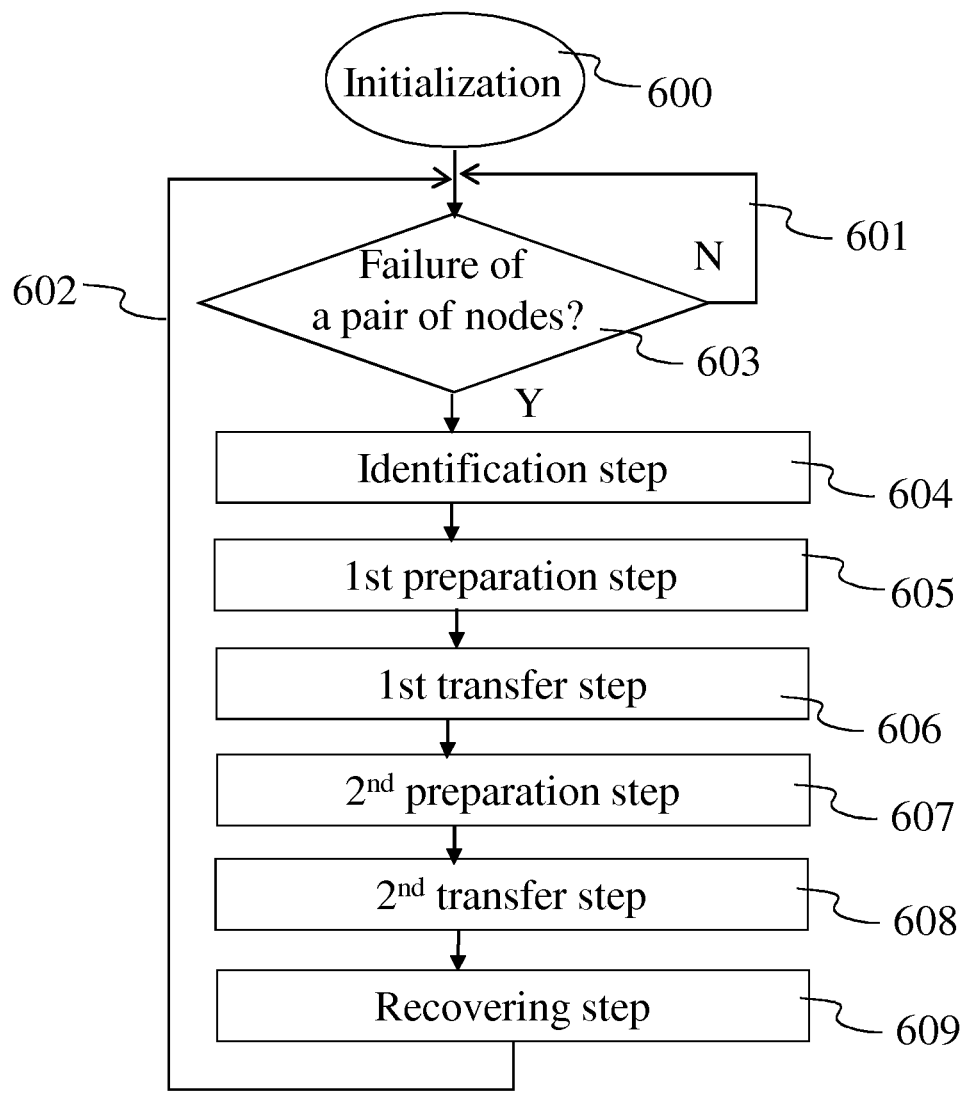
FIG. 6 shows the method according to the invention in algorithmic form.

FIG. 6 shows the method according to the invention in algorithmic form. In an initialization step (600), method is initialized. This initialization comprises for example initialization of variables or memory space required for application of the method. In a decisional step (603) it is decided if a pair of storage nodes have failed. If not so, the decisional step is repeated (arrow 601). If so, in an identification step 604, first lost and second lost blocks are identified, replacement nodes are chosen, and first and second sets of non-failed nodes for exact repair of the failed storage node pair are determined. Then, in a first preparation step (605), linear operations are applied to each of chosen non-failed nodes, resulting in 1st & $2^{nd}$ result sub-blocks. In a first transfer step (606), these result sub-blocks are transferred to the replacement nodes. In a second preparation step (607), a third and a fourth sub-blocks are calculated over all sub-blocks received by each replacement node. In a second transfer step (608), these third and fourth sub-blocks are transferred to the replacement nodes. In a recovery step (609) all first and all second lost sub-blocks are recovered by individually processing all sub-blocks received by the replacement nodes. Finally, the process is repeated (arrow 602).

The method is described in more detail in the description of FIGS. 3a-c, 4a-c and 5.

Figure 7:
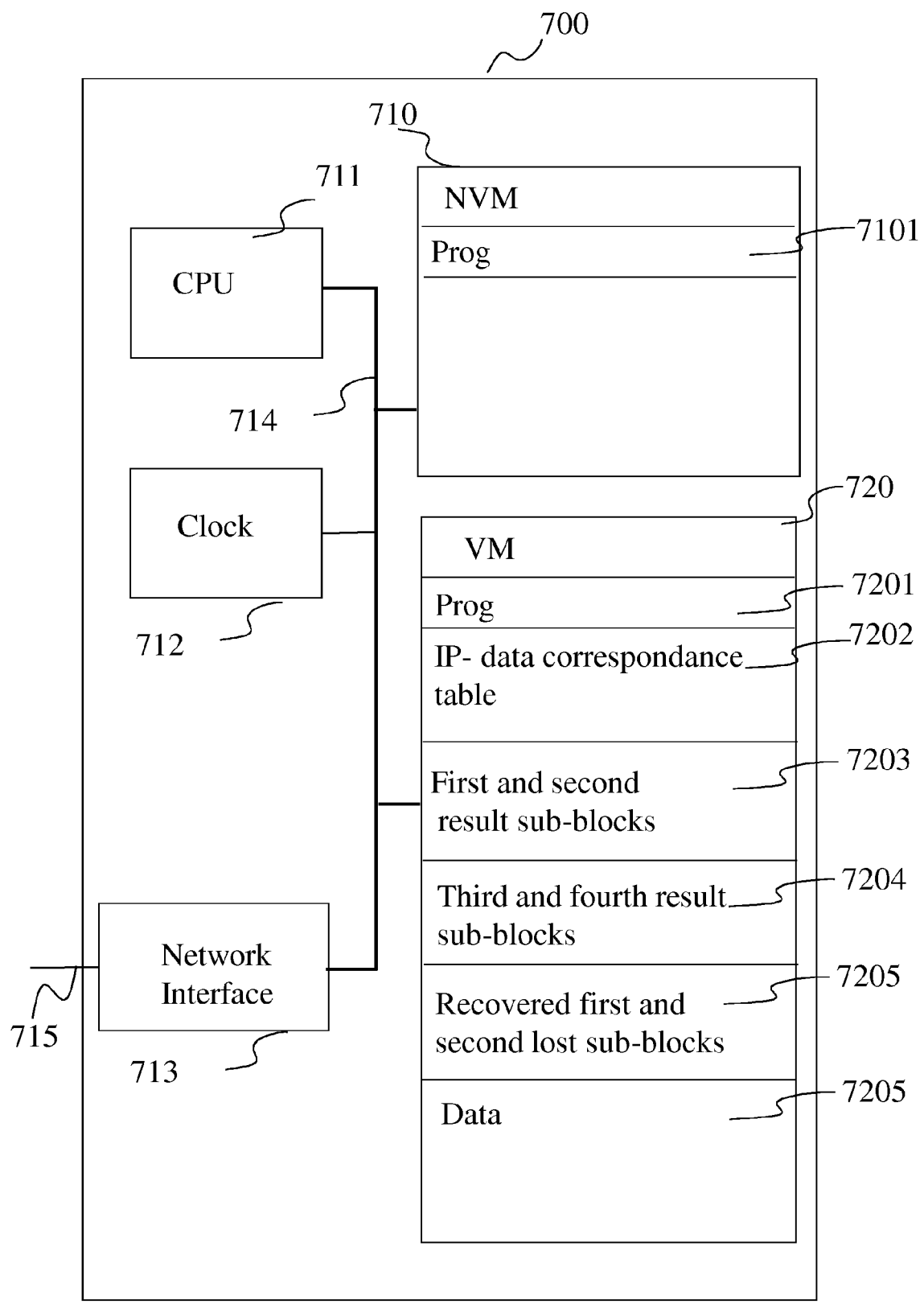
FIG. 7 shows a storage node device that can be used as a storage node in a distributed storage system that implements the method of the invention.

FIG. 7 shows a storage node device 700 that can be used as a storage node in a distributed storage system that implements the method of the invention, which method is illustrated by means of FIGS. 3a-c, 4a-c, 5 and 6. The device 700 comprises the following components, interconnected by a digital data- and address bus 714:

- a processing unit 711 (or CPU for Central Processing Unit);
- a non-volatile memory NVM 710;
- a volatile memory VM 720;
- a clock 712, providing a reference clock signal for synchronization of operations between the components of the device 700 and for timing purposes;
- a network interface 713, for interconnection of device 700 to other devices connected in a network via connection 715.

It is noted that the word "register" used in the description of memories 710 and 720 designates in each of the mentioned memories, a low-capacity memory zone capable of storing some binary data, as well as a high-capacity memory zone, capable of storing an executable program, or a whole data set.

Processing unit 711 can be implemented as a microprocessor, a custom chip, a dedicated (micro-) controller, and so on. Non-volatile memory NVM 710 can be implemented in any form of non-volatile memory, such as a hard disk, non-volatile random-access memory, EPROM (Erasable Programmable ROM), and so on.

The Non-volatile memory NVM 710 comprises notably a register 7201 that holds a program representing an executable program comprising the method of exact repair according to the invention. When powered up, the processing unit 711 loads the instructions comprised in NVM register 7101, copies them to VM register 7201, and executes them.

The VM memory 720 comprises notably:
- a register 7201 comprising a copy of the program 'prog' of NVM register 7101;

a register 7202 comprising a node IP address—stored data block correspondence table;

a register 7203 comprising a storage space for first and second result sub-blocks;

a register 7204 for storing of the third and the second sub-blocks;

a register 7205 for storing of the recovered first and second lost sub-blocks;

a data storage 7206 for storage of temporary results of calculation.

A device such as device 700 is suited for implementing the method of the invention of exact repair of pairs of failed storage devices interconnected in a distributed storage system, the device comprising means for identification (CPU 711, VM register 7202) of data lost by a failure of a pair of failed storage devices, where lost data is identified as a first lost block (303*a*) and a second lost block (303*b*), the first lost block comprising first lost sub-blocks and the second lost block comprising second lost sub-blocks and a first new storage device (318) and a second new storage device (319) is chosen to replace the pair of failed storage devices, and a first set (331) and a second set (330) of at least three non failed storage devices are determined for participating in the exact repair;

means for application (CPU 711) of a first preparation step (350) where a first linear operation is applied to each of the storage devices in the first set over all sub-blocks stored by it, resulting in a first result sub-block (344-346) that aligns interfering information about the second lost block, and a second linear operation is applied to each of the storage devices in the second set over all sub-blocks stored by it, resulting in a second result sub-block (347-349) that aligns interfering information about the first lost block;

means for transmission (Network Interface 713, VM register 7203) of all first result sub-blocks to the first new storage device, and for transmission of all second result sub-blocks to the second new storage device;

means for executing (CPU 711, VM register 7204) a second preparation step (352) where the first linear operation is applied to the first new storage device over all sub-blocks received by it, resulting in a third result sub-block (353) that aligns interfering information about the first lost block, and the second linear operation is applied to the second new storage device over all sub-blocks received by it, resulting in a fourth result sub-block (354) that aligns interfering information about the second lost block;

means for transmission (Network interface 713, VM register 7204) the third result sub-block to the second new storage device, and for transmission of the fourth result sub-block to the first new storage device;

means for recovery (CPU 711) of the first lost sub-blocks through calculation from all sub-blocks received by the first new storage device, and of the second lost sub-blocks through calculation from all sub-blocks received by the second new storage device.

Other device architectures than illustrated by FIG. 7 are possible and compatible with the method of the invention. Notably, according to variant embodiments, the invention is implemented as a pure hardware implementation, for example in the form of a dedicated component (for example in an ASIC, FPGA or VLSI, respectively meaning Application Specific Integrated Circuit, Field-Programmable Gate Array and Very Large Scale Integration), or in the form of multiple electronic components integrated in a device or in the form of a mix of hardware and software components, for example a dedicated electronic card in a personal computer.

The method according to the invention can be implemented according to different variant embodiments.

Though the method applies to repair of pairs of nodes, a threshold can be installed to trigger the repair per pair of failed nodes if the number of failed nodes drops below a determined level. For example, instead of immediately repairing a pair of failed nodes when they have failed, it is possible to wait until a determined multiple of pairs fail, so that these repairs can, for example, be grouped and be programmed during a period of low activity, for example during nighttime. Of course, the distributed data storage system must then be dimensioned such that it has a data redundancy level that is high enough to support a failure of multiple pairs.

According to a variant embodiment of the invention, the repair method of the invention that applies to repair of multiple nodes is combined with a known method of exact repair for a single node, for example using MSR scalar codes. This is advantageous when an impair number of nodes needs to be repaired, for example 3, 5, 7 or 15. Then, the repair method of the invention is applied to repair the pair number of failed nodes, and the known method of exact repair for a single node is used to repair the remaining failed node.

According to a variant embodiment of the invention, a repair management server is used to manage the repair of node failures, in which case the steps are executed by the repair management server. Such a repair management server can for example monitor the number of node failures to trigger the repair of node pairs, with or without a previous mentioned threshold. According to yet another variant embodiment the management of the repair is distributed over the storage nodes in the distributed data storage system, which has an advantage to distribute repair load over these devices and further renders the distributed data system less prone to management server failures (due to physical failure or due to targeted hacker attacks). In such a distributed variant embodiment, clouds can be created of nodes that monitor themselves the node failure for a particular data item, and that trigger autonomously a repair action when the node failure drops below a critical level. In such a distributed repair management, the steps of the method are implemented by several nodes, the nodes communicating between them to synchronize the steps of the method and exchange data.

Besides repairing exactly pairs of failed storage nodes, the method of the invention can also be used to add redundancy to a distributed storage system. For example as a preventive action when new measures of the number of observed device failures show that the number of device failures that can be expected is higher than previously estimated.

According to a variant embodiment of the invention, a storage node can store more than one encoded block of a particular file. In such a case, a device according to the invention can store more than one encoded blocks of a same file i, and/or can store encoded blocks of more than one file i.

The invention claimed is:

1. A method for exact repair of sets of two failed storage nodes interconnected in a distributed storage system, the method comprising:

encoding a data item of two blocks into n blocks, each of the n blocks being stored on a storage node belonging to a set of n storage nodes, each of the n blocks comprising a number of sub-blocks greater than two, and n is an integer;

identifying data lost by a failure of a pair of failed storage nodes as a first lost block and a second lost block, said first lost block comprising first lost sub-blocks and said second lost block comprising second lost sub-blocks, choosing a first new storage node and a second new storage node to replace said pair of failed storage nodes, and determining a first set and a second set of at least three non-failed storage nodes for participating in said exact repair;

applying a first linear interference alignment operation to each of the storage nodes in said first set over sub-blocks stored by the storage nodes, said first linear interference alignment operation being a scalar product between each of the sub-blocks stored by said each of the storage nodes and a repair vector, thus obtaining a first result sub-block, the repair vector being chosen so that information about each of the sub-blocks stored by the storage nodes in the first set is identical in all of said first result sub-block, and applying a second linear interference alignment operation to each of the storage nodes in said second set over sub-blocks stored by the storage nodes, said second linear interference alignment operation being a scalar product between each of the sub-blocks stored by said each of the storage nodes and a repair vector, thus obtaining a second result sub-block, said repair vector being chosen so that information about each of the sub-blocks stored by the storage nodes in the second set is identical in all of said second result sub-block;

transferring all first result sub-blocks to said first new storage node, and transferring all second result sub-blocks to said second new storage node;

applying said first linear interference alignment operation to said first new storage node over the transferred sub-blocks, resulting in a third result sub-block that aligns interfering information about said first lost block, and applying said second linear interference alignment operation to said second new storage node over the transferred sub-blocks, resulting in a fourth result sub-block that aligns interfering information about said second lost block;

transferring the third result sub-block to said second new storage node, and transferring said fourth result sub-block to said first new storage node; and recovering by calculating said first lost sub-blocks from all sub-blocks received by said first new storage node, and calculating said second lost sub-blocks from all sub-blocks received by said second new storage node.

2. The method according to claim 1, wherein said first and said second set of non-failed storage nodes are determined such that said first and said second set of non-failed storage nodes comprise the same storage nodes.

3. The method according to claim 1, wherein said first and said second set of non-failed storage nodes are determined such that said first and said second set of non-failed nodes comprise at least one distinct storage node.

4. The method according to claim 1, wherein said first and said second set of non-failed storage nodes are determined such that said first and said second set of non-failed nodes comprise totally distinct storage nodes.

5. The method according to claim 2, wherein a storage node is implemented by one or more distinct storage devices.

6. The method according to claim 2, wherein a storage node is implemented by one or more same storage device.

7. A device for exact repair of sets of two failed storage nodes interconnected in a distributed storage system, wherein a data item of two blocks is encoded into n blocks, each of the n blocks being stored on a storage node belonging to a set of n storage nodes, each of the n blocks comprising a number of sub-blocks greater than two, and n is an integer, said device comprising:

a memory; and a processing unit coupled to the memory and configured to:

identify data lost by a failure of a pair of failed storage nodes, where lost data is identified as a first lost block and a second lost block, said first lost block comprising first lost sub-blocks and said second lost block comprising second lost sub-blocks, to choose a first new storage node and a second new storage node to replace said pair of failed storage nodes, and to determine a first set and a second set of at least three non-failed storage nodes for participating in said exact repair;

apply a first linear interference alignment operation to each of the storage nodes in said first set over sub-blocks stored by said each of the storage nodes, said first linear interference alignment operation being a scalar product between each of the sub-blocks stored by each of the storage nodes and a repair vector, thus obtaining a first result sub-block, said repair vector being chosen so that information about each of the sub-blocks stored by the storage nodes in the first set is identical in all of said first result sub-block, and apply a second linear interference alignment operation to each of the storage nodes in said second set over sub-blocks stored by each of the storage nodes, said second linear interference alignment operation being a scalar product between each of the sub-blocks stored by said each of the storage nodes and a repair vector, thus obtaining a second result sub-block, said repair vector being chosen so that information about each of the sub-blocks stored by the nodes in the second set is identical in all of said second result sub-block;

transmit all first result sub-blocks to said first new storage node, and transmit all second result sub-blocks to said second new storage node;

apply said first linear interference alignment operation to said first new storage node over all received sub-blocks, resulting in a third result sub-block that aligns interfering information about said first lost block, and apply said second linear interference alignment operation to said second new storage node over all received sub-blocks, resulting in a fourth result sub-block that aligns interfering information about said second lost block;

transmit the third result sub-block to said second new storage node, and transmit said fourth result sub-block to said first new storage node;

recover said first lost sub-blocks through calculation from all sub-blocks received by said first new storage node, and recover said second lost sub-blocks through calculation from all sub-blocks received by said second new storage node.

8. The device according to claim 7, wherein said first and said second set of non-failed storage nodes are determined such that said first and said second set of non-failed storage nodes comprise the same storage nodes.

9. The device according to claim 7, wherein said first and said second set of non-failed storage nodes are determined such that said first and said second set of non-failed nodes comprise at least one distinct storage node.

10. The device according to claim 7, wherein said first and said second set of non-failed storage nodes are determined such that said first and said second set of non-failed nodes comprise totally distinct storage nodes.

11. The device according to claim 8, wherein a storage node is implemented by one or more distinct storage devices.

12. The device according to claim 8, wherein a storage node is implemented by one or more same storage devices.

13. A distributed storage system interconnecting storage devices, the system comprising:
- a set of n storage devices configured to store a data item of two blocks encoded into n blocks, each of the n blocks being stored on a storage device belonging to the set of n storage devices, each of the n blocks comprising a number of sub-blocks greater than two, and n is an integer; and
- a processing unit configured to:
  - identify data lost by a failure of a pair of failed storage devices, where the lost data is identified as a first lost block and a second lost block, the first lost block comprising first lost sub-blocks and the second lost block comprising second lost sub-blocks and a first new storage device and a second new storage device are chosen to replace the pair of failed storage devices, and a first set and a second set of at least three non-failed storage devices are determined for participating in a repair of the pair of failed storage devices;
  - apply a first linear interference alignment operation to each of the storage devices in the first set over sub-blocks stored by the storage devices, said first linear interference alignment operation being a scalar product between each of the sub-blocks stored by each of the storage devices and a repair vector, thus obtaining a first result sub-block, said repair vector being chosen so that information about each of the sub-blocks stored by the storage devices in the first set is identical in all of said first result sub-block, and apply a second linear interference alignment operation to each of the storage devices in said second set over sub-blocks stored by the storage devices, said second linear interference alignment operation being a scalar product between each of the sub-blocks stored by said each of the storage devices and a repair vector, thus obtaining a second result sub-block, said repair vector being chosen so that information about each of the sub-blocks stored by the devices in the second set is identical in all of said second result sub-block;
  - transmit all first result sub-blocks to said first new storage device, and transmit all second result sub-blocks to said second new storage device;
  - apply said first linear interference alignment operation to said first new storage device over all received sub-blocks, resulting in a third result sub-block that aligns interfering information about said first lost block, and apply said second linear interference alignment operation to said second new storage device over all received sub-blocks, resulting in a fourth result sub-block that aligns interfering information about said second lost block;
  - transmit the third result sub-block to said second new storage device, and transmit said fourth result sub-block to said first new storage device;
  - recover said first lost sub-blocks through calculation from all sub-blocks received by said first new storage device, and recover said second lost sub-blocks through calculation from all sub-blocks received by said second new storage device.

14. The distributed storage system according to claim 13, wherein said first and said second set of non-failed storage devices are determined such that said first and said second set of non-failed storage devices comprise the same storage devices.

15. The distributed storage system according to claim 13, wherein said first and said second set of non-failed storage devices are determined such that said first and said second set of non-failed devices comprise at least one distinct storage device.

16. The distributed storage system according to claim 13, wherein said first and said second set of non-failed storage devices are determined such that said first and said second set of non-failed devices comprise totally distinct storage devices.

* * * * *